United States Patent [19]

Shuster

[11] Patent Number: 5,108,856

[45] Date of Patent: Apr. 28, 1992

[54] ELECTROLYTE COMPOSITIONS AND METHODS

[75] Inventor: Nicholas Shuster, Madison, Ohio

[73] Assignee: Westinghouse Electric Corp., Pittsburgh, Pa.

[21] Appl. No.: 512,010

[22] Filed: Apr. 12, 1990

Related U.S. Application Data

[63] Continuation of Ser. No. 323,229, Mar. 13, 1989, abandoned, which is a continuation-in-part of Ser. No. 863,450, May 15, 1986, abandoned.

[51] Int. Cl.$^5$ .................... H01M 6/16; H01M 6/04
[52] U.S. Cl. .................... 429/198; 429/206
[58] Field of Search .................... 429/206, 195, 198

[56] References Cited

U.S. PATENT DOCUMENTS

| | | | |
|---|---|---|---|
| 3,403,055 | 9/1968 | Weiss et al. | 429/46 |
| 3,791,871 | 2/1974 | Rowley | 429/118 |
| 3,956,018 | 5/1976 | Kozawa | 429/206 |
| 3,976,509 | 8/1976 | Tsai et al. | 429/194 |
| 4,007,057 | 2/1977 | Littauer et al. | 429/57 |
| 4,074,028 | 2/1978 | Will | 429/198 |
| 4,195,120 | 3/1980 | Rossler et al. | 429/50 |
| 4,377,625 | 3/1983 | Parsen et al. | 429/198 |
| 4,677,041 | 6/1987 | Specht | 429/206 |

OTHER PUBLICATIONS

Hachk's Chemical Dictionary, p. 650, 1972.
Goldsmith, Metal Finishing 56th Guidebook, p. 149, 1988.

*Primary Examiner*—John Niebling
*Assistant Examiner*—Steven P. Marquis
*Attorney, Agent, or Firm*—D. Schron

[57] ABSTRACT

A surfactant is present in an aqeuous alkaline electrolyte of a consumable metal anode electrochemical cell in a concentration sufficient to substantially reduce both the surface tension of the electrolyte and the rate of the parasitic corrosion reaction occurring between the electrolyte and the anode. The surfactant is useful in minimizing the harmful side effects, such as increased heat generation, anode consumption without producing useful energy and increased hydrogen gas production rates, such as are associated with the parasitic corrosion reaction experienced in such electrochemical cells.

49 Claims, 1 Drawing Sheet

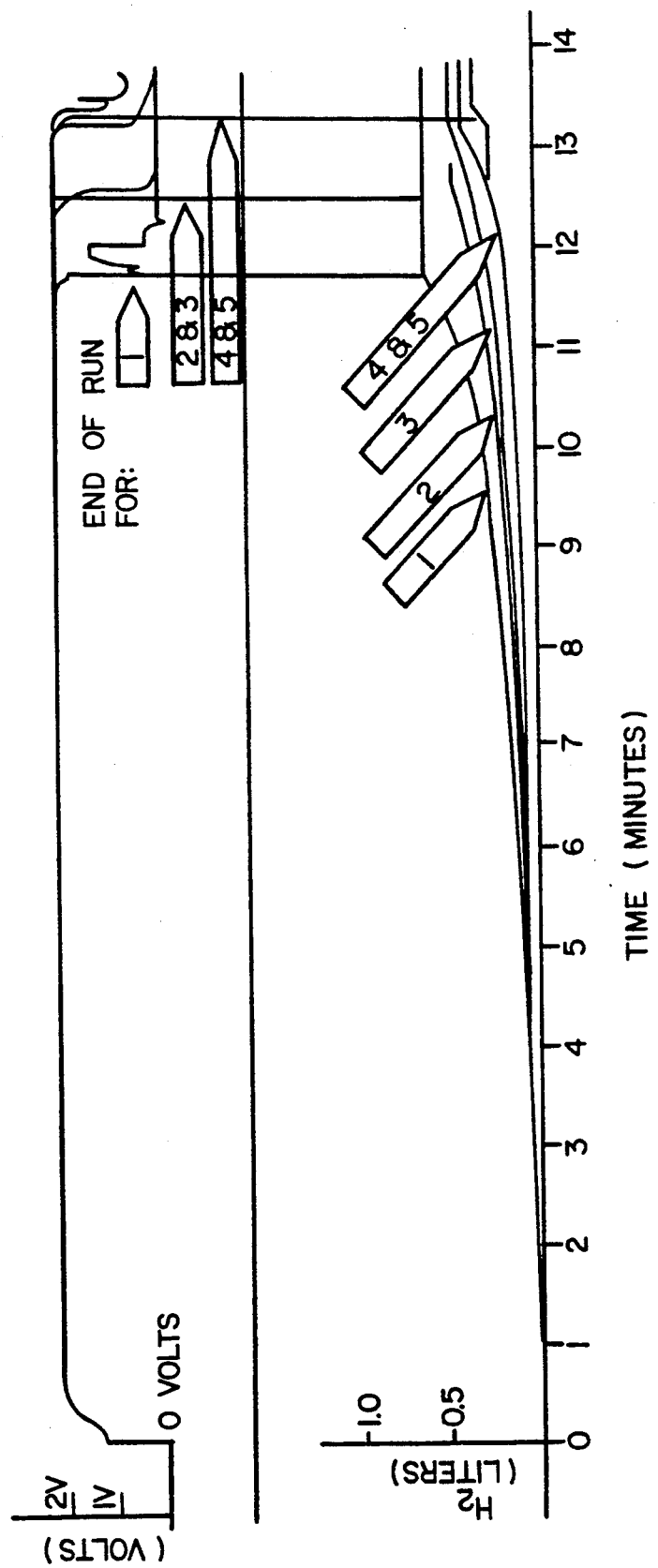

ELECTROLYTE COMPOSITIONS AND METHODS

CROSS REFERENCE TO RELATED APPLICATION

This application is a continuation of application Ser. No. 07/323,229, filed Mar. 13, 1989, abandoned, which is a continuation-in-part of copending, commonly assigned, application Ser. No. 863,450, filed May 15, 1986, abandoned.

BACKGROUND OF THE INVENTION

1. Field of the Invention

The present invention relates generally to electrochemical cells and, more specifically, this invention relates to aqueous electrolyte compositions useful in consumable metal anode cells and resulting in improved battery performance.

2. Description of the Related Art

Electrochemical cells utilizing consumable metal anodes are well known. Typically, the anode comprises a reactive metal, such as an alkali metal, in conjunction with a cathode and an aqueous electrolyte.

The cell disclosed in Rowley U.S. Pat. No. 3,791,871 (February 12, 1974), the disclosure of which is hereby incorporated by reference, typifies prior electrochemical cells utilizing a consumable metal anode and an aqueous electrolyte. The operation of such cells involves the following reactions which, for illustrative purposes, utilize lithium as the active material of the consumable metal anode, and aqueous lithium hydroxide as the electrolyte.

| A. Anode Reaction | |
|---|---|
| Electrochemical Dissolution | |
| $Li \rightarrow Li^+_{(aq)} + e^-$ | (1) |
| Formation of Insulating Film on Anode | |
| $Li^+_{(aq)} + OH^-_{(aq)} \rightarrow LiOH_{(aq)}$ | (2) |
| $LiOH_{(aq)} \rightarrow LiOH_{(s)}$ | (3) |
| Parasitic Corrosion Reaction | |
| $Li + H_2O \rightarrow LiOH_{(aq)} + \frac{1}{2}H_{2(g)}$ | (4) |
| B. Cathode Reaction | |
| Reduction of Water | |
| $H_2O + e^- \rightarrow OH^- + \frac{1}{2}H_{2(g)}$ | (5) |

(aq) represents an ion dissolved in water and (s) represents a solid salt.

Reactions (1) and (5) are necessary for the generation of electricity. Reactions (2) and (3) serve to produce a porous insulating film which forms on the anode and protects it. Reaction (4) is a parasitic corrosion reaction which generates no useful current.

The parasitic corrosion reaction shown above, i.e., equation (4), is highly exothermic, having a $\Delta H_r = -53.3$ kcal/gm mole Li. Ideally, during discharge, there should be no chemical corrosion reaction at the anode surface so that the faradaic efficiency of the cell approaches 100% as all of the lithium is utilized in the generation of useful electrical current.

Also, during operation of the cell, excess heat must be removed from the electrolyte, otherwise a loss in efficiency would result.

Likewise, depolarization of a cell must be accomplished, such as by removal of hydrogen gas.

Furthermore, it is believed that the parasitic corrosion reaction is responsible for uneven anode surface erosion and ultimate anode breakthrough.

SUMMARY OF THE INVENTION

It is an object of the present invention to overcome one or more of the problems described above.

According to the present invention, an electrochemical cell includes a consumable metal anode, a cathode spaced from the anode and an aqueous alkaline electrolyte which is in contact with both the anode and the cathode during operation of the cell. The electrolyte includes an amount of surfactant sufficient to substantially reduce the surface tension of the electrolyte. The surfactant reduces the parasitic consumption of the consumable metal anode and the production rates of the concomitant unfavorable reaction by-products.

In addition to the electrochemical cell, the invention comprehends a method of reducing the parasitic consumption of a consumable metal anode in an electrochemical cell and a method of providing electrical energy.

Other objects and advantages of the invention will be apparent to those skilled in the art from the following detailed description, taken in conjunction with the drawing and the appended claims.

BRIEF DESCRIPTION OF THE DRAWING

The sole figure shows voltage vs. time and hydrogen gas generation vs. time for five trial runs, as described in the Example.

DETAILED DESCRIPTION OF THE INVENTION

According to the invention, an electrochemical cell is provided wherein an aqueous alkaline electrolyte, in contact with an anode and a cathode during operation of the cell, includes a surfactant. The surfactant is present in an amount sufficient to substantially reduce the surface tension of the electrolyte.

As described above, the parasitic corrosion anodic reaction, equation (4), results in generation of heat, production of hydrogen gas and consumption of the anodic material without production of useful energy. More efficient removal of hydrogen gas bubbles generated on the anode surface during discharge results in more efficient removal of generated heat and a slowing of localized rates of reaction, which in turn permits better control of the anode surface morphology.

The presence of a surfactant in the aqueous electrolyte results in a reduction in the surface tension of the electrolyte and, since surfactants can be effective in minute quantities, little or no volumetric and/or gravimetric penalty accompanies their use. As a result of the reduction in the surface tension, the hydrogen gas bubbles which form as a consequence of the parasitic corrosion reaction are more uniformly sized and evenly dispersed than the hydrogen gas bubbles formed in comparable cells but not including an effective amount of a surfactant therein.

The surfactant should be a material stable and nonreactive in an alkaline medium and also stable in the electrochemical environment of the anodic and cathodic materials. The term "surfactant" refers to surface active agents having a structure characterized by a hydrophilic polar group and a hydrophobic tail. These surfaces active agents are generally long-chain molecules, typically containing at least 8 carbon atoms. Surfactants adsorb at a liquid/solid or liquid/vapor interface and are effective in modifying interfacial properties including interfacial tension at very low concentrations. Surfactants are also characterized by properties such as a hydrophoboc effect, light scattering effects and solubilization effects. Specifically, increasing concentrations of surfactants tend to significantly reduce surface tension until they reach a break point known as the critical micelle concentration (CMC). It is known that increased concentrations of surfactants above the CMC tend to only slightly affect surface tension and that surfactant micelles form at concentrations in excess of the CMC.

Any effective surfactant may be used in the practice of the present invention, including anionic, nonionic and cationic surfactants. Surfactants that have been tested and have been found useful in the practice of the present invention include the anionic surfactants Fluorad TM (a trademark of 3M Company) FC-129, ZONYL TM (a trademark of DuPont Company) FSA and ZONYL TM FSJ; the cationic surfactant ZONYL TM FSC; and the nonionic surfactant Triton TM X-100 (a trademark of Rohm & Haas Co.). Anionic surfactants, however, are preferred.

Anionic groups on surfactant molecules that can ionize and become attracted to the anode surface are highly preferred. Two preferred anionic groups are carboxylates and sulfonates. It is believed that anion exchange type surfactants migrate to the surface of the anode, with the negatively charged anionic groups aligning themselves with the positively charged surface of the anode. Thus, with the anionic groups ionized and attracted to the anode surface, the activity of water at or near the surface of the anode is greatly reduced.

The Fluorad TM brand fluorochemical surfactant FC-129, of 3M Company, is a highly preferred anionic surfactant for use in the practice of the present invention. The term "fluorochemical" denotes those organic compounds, not necessarily hydrocarbons, in which a large percentage of the hydrogen directly attached to carbon has been replaced by fluorine. The Fluorad FC-129 surfactant consists of 50% active solids dissolved in 2-butoxyethanol, ethyl alcohol and water. The active solids in FC-129 may be described as potassium fluorinated alkyl carboxylates.

Surfactants may generally be used in concentrations greater than about 50 ppm with the upper concentration range being dictated primarily by economics and/or the critical micelle concentration. Accordingly, concentrations of surfactants will generally range between 50 ppm and 5% and preferably between 50 ppm and 1%.

Generally, the use of anionic surfactants has proved effective in concentrations as low as about 50 ppm but levels of 100 to 200 ppm are preferred. (Concentrations as used herein are with reference to active materials.) Not all surfactants are equally effective and, consequently, different quantities of other surfactants may be needed to attain the benefits of the present invention.

It has been found that the presence of a sufficient amount of surfactant in the electrolyte reduces the surface tension of the electrolyte from a typical 70-80 (e.g. 76.0) dynes/cm: for surfactant-free electrolyte to values ranging from less than 30 dynes/cm$^2$ (e.g. 15-20 dynes/cm$^2$) up to about 50-55 dynes/cm$^2$.

The present invention is applicable generally to electrochemical cells having a consumable metal anode. The anode typically is of aluminum or an alkali metal such as sodium, for example, and preferably is of lithium. The anodic metal may be present in elemental, compound, complex, amalgam or mixture form, as is known in the art.

In conventional consumable anode electrochemical cells having a lithium anode mounted on a conductive substrate current collector, the surface of the lithium anode becomes highly irregular during discharge due to local variations in the electrolyte flow, temperature, concentration and/or current density. As a result, toward the end of discharge, when the average lithium thickness is small, some thin spots in the lithium layer will break through the lithium electrode and expose the substrate current collector. This "breakthrough" phenomenon results in a "shorted cell" that has increased anode polarization, reduced overall cell voltage, increased heat and hydrogen gas production rates, and increased consumption of the anode material. The anode material so consumed consequently is not available for supplying current to the load. The present invention results in more uniform wear of the anode surface and consequently delays and minimizes the detrimental effects realized upon anode breakthrough.

Conventional methods of electrochemical cell power generation utilize pumps in the transportation of electrolyte. Such pumps, however, commonly experience difficulty in pumping liquid and intermittent quantities of gas, commonly referred to as a "two-phase pumping problem". The present invention, by reducing the amount of gas produced, and resulting in smaller gas bubbles and a more even dispersion of gas, reduces the two-phase pumping problem.

The present invention comprehends a method of providing electrical energy from an electrochemical cell wherein the aqueous alkaline electrolyte supplied to the electrochemical reaction zone defined between the cathode and consumable metal anode of the cell includes an amount of surfactant sufficient to substantially reduce the surface tension of the electrolyte.

The concept of the present invention can be extended to cross linking or polymerizing an anionic surfactant to produce an electrically conductive ionomer on the surface of the anode, as by means known in the art. A layer of such an ionomer reduces water activity at the anode surface and thus reduces the rate of the parasitic corrosion reaction, while also providing an electrically conductive layer on the anode surface.

EXAMPLE

The following example illustrates the practice of the present invention. It is understood that all changes and modifications that come within the spirit of the invention are desired to be protected and thus the invention is not to be construed as limited by this example.

The invention has been tested in a cell including a square lithium anode and a square porous silver oxide cathode, each having an original working surface area of four square inches. The test cell had an interelectrode gap of 15 mil. Aqueous lithium hydroxide electrolyte, having a molarity of 4.3-4.5, and at a temperature of 45° C., was permitted to flow across the lithium anode face so as to give a constant power output of 2.1 volts, a current of 21 amps and a resulting current density of 0.81A/cm$^2$.

The Figure shows the voltage vs. time and the hydrogen gas generation vs. time results for five separate runs. Table 1, below, shows the amount and type of surfactant used in each of the runs.

TABLE 1

| RUN | SURFACTANT |
|---|---|
| 1 | None |

TABLE 1-continued

| RUN | SURFACTANT |
|---|---|
| 2 | 5 cc of Triton X-100 in 1700 cc of 4.3 M LiOH |
| 3 | 10 cc of Triton X-100 in 1700 cc of 4.3 M LiOH |
| 4 | 0.01 wt. % active material Fluorad FC-129 in 4.3 M LiOH |
| 5 | Same as Run 4 |

It was found that the test cells had considerably longer run times at constant voltages when a sufficient concentration of surfactant was present in the electrolyte as compared to identical cells which did not have surfactant present in the electrolyte. Other benefits realized in the cells operated with surfactants included lower hydrogen gassing rates, better gas characteristics (such as the gas formed being more evenly dispersed in the electrolyte) and minimization of the rate of lithium consumption.

In all cases using surfactants, the onset of substantial gassing was delayed, and the cumulative volume of hydrogen gas produced was lowered, as compared to the test using a surfactant-free electrolyte. The test using the higher concentration of Triton X-100 surfactant showed an improvement over the test using a lower Triton X-100 surfactant concentration, but both tests exhibited significantly poorer performance than the test using Fluorad FC-129 anionic surfactant in terms of run duration at constant voltage, time of onset of hydrogen gassing, and cumulative volume of hydrogen gas produced.

Additional Observations

The hydrogen bubbles produced during the runs employing Fluorad FC-129 surfactant were very small and very well dispersed. There was no evidence of any large, agglomerated bubbles. The gassing pattern was noticeably different than previous trials which did not employ surfactants.

Another interesting feature is the run time available at full voltage (2.1V) before battery performance declines. Examination of the voltage graphs of the Figure clearly shows that the use of surfactant can extend run time. Small amounts of Fluorad FC-129 yield performance superior to that obtained with relatively high levels of Triton X-100.

Further testing has shown that the results obtained are very reproducible and are directly scalable from the lab cells tested to cells comprising 11" diameter electrodes. Tests were conducted on 11" diameter electrode cells employing 100 ppm FC-129 in the starting electrolyte and diluent. The corrosion rates obtained in the cells having the larger electrodes were somewhat less than the corrosion rates obtained in the lab cell tests. The gassing rate data suggest a parasitic reaction rate of only 6-7%, i.e., the lithium consumed parasitically is only 6-7% of the lithium consumed electrochemically at 0.81 amps/cm$^2$. It is believed that the better results obtained with the larger cells may be a consequence of the larger anodes having a relatively low proportion of edge surface area as compared to active surface area. This data indicates that the beneficial effects of FC-129 can be realized on a larger scale.

The foregoing detailed description is given for clearness of understanding only, and no unnecessary limitations should be understood therefrom, as modifications within the scope of the invention will be obvious to those skilled in the art.

I claim:

1. An electrochemical cell, comprising:
   a consumable metal anode which comprises a reactive metal selected from the group consisting of alkali metals and aluminum;
   a cathode spaced from said anode; and,
   an electrolyte in contact with said anode and said cathode and defining an interface with said anode during operation of the cell, said electrolyte including a surfactant containing at least 8 carbon atoms and having a structure characterized by a hydrophilic polar group and a hydrophobic tail in a concentration sufficient to substantially reduce both the surface tension of said electrolyte and the rate of the parasitic corrosion reaction occurring between said electrolyte and said anode metal at said interface.

2. The electrochemical cell of claim 1 wherein said electrolyte comprises an aqueous alkaline electrolyte.

3. The electrochemical cell of claim 2 wherein said surfactant comprises an anionic surfactant.

4. The electrochemical cell of claim 3 wherein the concentration of said surfactant in said electrolyte is at least about 50 ppm.

5. The electrochemical cell of claim 4 wherein the concentration of said surfactant in said electrolyte is about 100-200 ppm.

6. The electrochemical cell of claim 1 wherein said surfactant is selected from the group consisting of anionic surfactants, nonionic surfactants and cationic surfactants.

7. The electrochemical cell of claim 1 wherein the molecules of said surfactant comprise carboxylate groups.

8. The electrochemical cell of claim 1 wherein the molecules of said surfactant comprise sulfonate groups.

9. The electrochemical cell of claim 1 wherein said surfactant comprises a fluorochemical surfactant.

10. The electrochemical of claim 9 wherein said fluorochemical surfactant comprises a potassium fluorinated alkyl carboxylate.

11. The electrochemical cell of claim 1 wherein said reactive metal comprises an alkali metal.

12. The electrochemical cell of claim 11 wherein said alkali metal comprises lithium.

13. The electrochemical cell of claim 1 wherein said anode comprises aluminum.

14. The electrochemical cell of claim 1 wherein said anode is adhered to a conductive metal substrate.

15. An electrochemical cell, comprising:
    a reactive metal anode which comprises a metal selected from the group consisting of alkali metals and aluminum;
    a cathode spaced from said anode; and
    an aqueous alkaline electrolyte in contact with said anode and said cathode and defining an interface with said anode during operation of said cell, said electrolyte including an anionic surfactant containing at least 8 carbon atoms and having a structure characterized by a hydrophilic polar group and a hydrophobic tail in a concentration sufficient to substantially reduce both the surface tension of said electrolyte and the rate of the parasitic corrosion reaction occurring between said electrolyte and said anode metal at said interface.

16. The electrochemical cell of claim 15 wherein the molecules of said anionic surfactant comprise carboxylate groups.

17. The electrochemical cell of claim 15 wherein the molecules of said anionic surfactant comprise sulfonate groups.

18. The electrochemical cell of claim 15 wherein said anionic surfactant comprises a fluorochemical surfactant.

19. The electrochemical cell of claim 18 wherein said fluorochemical surfactant comprises a potassium fluorinated alkyl carboxylate.

20. The electrochemical cell of claim 15 wherein said reactive metal comprises an alkali metal.

21. The electrochemical cell of claim 20 wherein said alkali metal comprises lithium.

22. The electrochemical cell of claim 15 wherein said anode comprises aluminum.

23. The electrochemical cell of claim 15 wherein said anode is adhered to a conductive metal substrate.

24. A method of reducing parasitic consumption of a consumable metal anode which comprises a reactive metal selected from the group consisting of alkali metals and aluminum in an electrochemical cell having an aqueous electrolyte, comprising adding a surfactant containing at least 8 carbon atoms and having a structure characterized by a hydrophilic polar group and a hydrophobic tail to the aqueous electrolyte in a concentration sufficient to substantially reduce the surface tension of said electrolyte.

25. The method of claim 24 wherein said surfactant is selected from the group consisting of anionic surfactants, nonionic surfactants and cationic surfactants.

26. The method of claim 25 wherein said surfactant comprises an anionic surfactant.

27. The method of claim 26 wherein the concentration of said surfactant in said electrolyte is at least about 50 ppm.

28. The method of claim 27 wherein the concentration of said surfactant in said electrolyte is about 100-200 ppm.

29. The method of claim 24 wherein the molecules of said surfactant comprise carboxylate groups.

30. The method of claim 24 wherein the molecules of said surfactant comprise sulfonate groups.

31. The method of claim 24 wherein said surfactant comprises a fluorochemical surfactant.

32. The method of claim 31 wherein said fluorochemical surfactant comprises a potassium fluorinated alkyl carboxylate.

33. The method of claim 24 wherein said reactive metal comprises an alkali metal.

34. The method of claim 33 wherein said alkali metal comprises lithium.

35. The method of claim 24 wherein said anode comprises aluminum.

36. The method of claim 24 wherein said anode is adhered to a conductive metal substrate.

37. A method of providing electrical energy from an electrochemical cells, comprising the steps of:

supplying an aqueous alkaline electrolyte to an electrochemical reaction zone defined between a cathode and a spaced consumable metal anode of said cell wherein said anode comprises a reactive metal selected from the group consisting of alkali metals and aluminum, said electrolyte including a surfactant containing at least 8 carbon atoms and having a structure characterized by a hydrophilic polar group and a hydrophobic tail in a concentration sufficient to substantially reduce both the surface tension of said electrolyte and the rate of the parasitic corrosion reaction occurring between said electrolyte and said anode metal.

38. The method of claim 37 wherein said surfactant is selected from the group consisting of anionic surfactants, nonionic surfactants and cationic surfactants.

39. The method of claim 38 wherein said surfactant comprises an anionic surfactant.

40. The method of claim 39 wherein the concentration of said surfactant in said electrolyte is at least about 50 ppm.

41. The method of claim 40 wherein the concentration of said surfactant in said electrolyte is about 100-200 ppm.

42. The method of claim 37 wherein the molecules of said surfactant comprise carboxylate groups.

43. The method of claim 37 wherein the molecules of said surfactant comprise sulfonate groups.

44. The method of claim 37 wherein said surfactant comprises a fluorochemical surfactant.

45. The method of claim 44 wherein said fluorochemical surfactant comprises a potassium fluorinated alkyl carboxylate.

46. The method of claim 37 wherein said reactive metal comprises an alkali metal.

47. The method of claim 46 wherein said alkali metal comprises lithium.

48. The method of claim 37 wherein said anode comprises aluminum.

49. The method of claim 37 wherein said anode is adhered to a conductive metal substrate.

* * * * *